United States Patent [19]
Flessner

[11] Patent Number: 5,987,912
[45] Date of Patent: Nov. 23, 1999

[54] LOW TEMPERATURE AIR CONVECTION COOLING/FREEZING APPARATUS

[76] Inventor: Stephen M. Flessner, 235 Needleleaf La., Sugar Land, Tex. 77479-5037

[21] Appl. No.: 09/179,228

[22] Filed: Oct. 26, 1998

[51] Int. Cl.$^6$ .................................................... F25D 17/08
[52] U.S. Cl. .................................. 62/407; 62/186; 62/419
[58] Field of Search ..................... 62/186, 419; 454/255, 454/340

[56] References Cited

U.S. PATENT DOCUMENTS

| | | |
|---|---|---|
| 4,662,186 | 5/1987 | Park . |
| 4,876,860 | 10/1989 | Negishi ...................................... 62/179 |
| 4,972,682 | 11/1990 | Smith et al. ............................... 62/405 |
| 5,111,664 | 5/1992 | Yang . |
| 5,187,947 | 2/1993 | Breunig et al. . |
| 5,355,686 | 10/1994 | Weiss .......................................... 62/89 |
| 5,421,168 | 6/1995 | Reynolds . |
| 5,471,849 | 12/1995 | Bessler ....................................... 62/186 |
| 5,657,639 | 8/1997 | Lidbeck . |
| 5,729,994 | 3/1998 | Mukaiyama et al. ...................... 62/186 |
| 5,816,060 | 10/1998 | Brownell et al. .......................... 62/186 |

*Primary Examiner*—Henry Bennett
*Assistant Examiner*—Mark Shulman
*Attorney, Agent, or Firm*—Nick A. Nichols, Jr.

[57] ABSTRACT

A refrigeration apparatus comprises a chilling compartment within a housing enclosing the chilling compartment and a refrigeration system for directing cold air into the chilling compartment. Cold air enters the chilling compartment through a plurality of inlet nozzles located in the walls of the compartment housing. A chilled air manifold connects the inlet nozzles to the refrigeration system. A control circuit includes an air temperature controller for selectively setting the air temperature. A timer and on/off controls are incorporated in the control circuit. A moisture sensor monitors the moisture of the chilled air flowing into the chilling compartment and terminates air flow into the compartment when the moisture in the air exceeds a predetermined level. The moisture on the drier bed is removed during a regeneration cycle, which directs hot air flow through a drier for reducing the water content to an acceptable level on the drier bed contents.

10 Claims, 3 Drawing Sheets

LOW TEMPERATURE AIR CONVECTION COOLING/FREEZING APPARATUS

BACKGROUND OF THE DISCLOSURE

The present invention relates generally to cooling apparatus, particularly to an air convection apparatus for quickly freezing, chilling or cooling foods, beverages and other items by low temperature refrigeration.

The typical household or commercial refrigeration process is exemplified by the common household refrigerator which cools a large food storage area. Some apparatus cool small compartments as disclosed in U.S. Pat. No. 5,657,639 to Lidbeck. In this reference, a refrigeration method and apparatus is discussed which comprises a housing having a plurality of refrigeratable compartments. Each of the compartments are isolated from the others and cold air is supplied to each of the compartments. The temperature of the cold air supply to the compartments may be individually adjusted. Thus, opening one compartment to a room temperature environment does not affect the temperature maintenance in any other compartment.

In U.S. Pat. No. 5,421,168 to Reynolds, a freezer system is described which first partially freezes food products through conductive heat transfer with rotating contact freezers and then completes freezing the food products in an enclosed convection freezer. The food products are carried through the convection freezer on a conveyor.

The known refrigeration apparatus do not provide a household appliance for chilling or freezing food, beverage or other food products which may subsequently be consumed or placed in a refrigerator or freezer for storage.

It is therefore an object of the present invention to provide a household counter top apparatus for quickly chilling or freezing food, beverage or other food products.

It is a further object of the present invention to provide a convection chilling or freezing apparatus including a control circuit for controlling the temperature and duration of air flow for chilling or freezing selected food, beverage or other food products.

SUMMARY OF THE INVENTION

According to the present invention, there is provided a refrigeration apparatus comprising a chilling compartment within a housing enclosing the chilling compartment and a refrigeration system for directing cold air into the chilling compartment. Cold air enters the chilling compartment through a plurality of inlet nozzles located in the walls of the compartment housing. An air manifold connects the inlet nozzles to the refrigeration system. A control circuit includes an air temperature controller for selectively setting the air temperature. A timer and on/off controls are incorporated in the control circuit. A moisture sensor monitors the moisture of the chilled air flowing into the chilling compartment and terminates air flow into the compartment when the moisture in the air exceeds a predetermined level. The moisture in the air is removed by directing the air flow through a drier until the air moisture is reduced to an acceptable level.

BRIEF DESCRIPTION OF THE DRAWINGS

So that the manner in which the above recited features, advantages and objects of the present invention are attained can be understood in detail, a more particular description of the invention, briefly summarized above, may be had by reference to the embodiments thereof which are illustrated in the appended drawings.

It is noted, however, that the appended drawings illustrate only typical embodiments of this invention and are therefore not to be considered limiting of its scope, for the invention may admit to other equally effective embodiments.

DETAILED DESCRIPTION OF A PREFERRED EMBODIMENT

Figure 1:
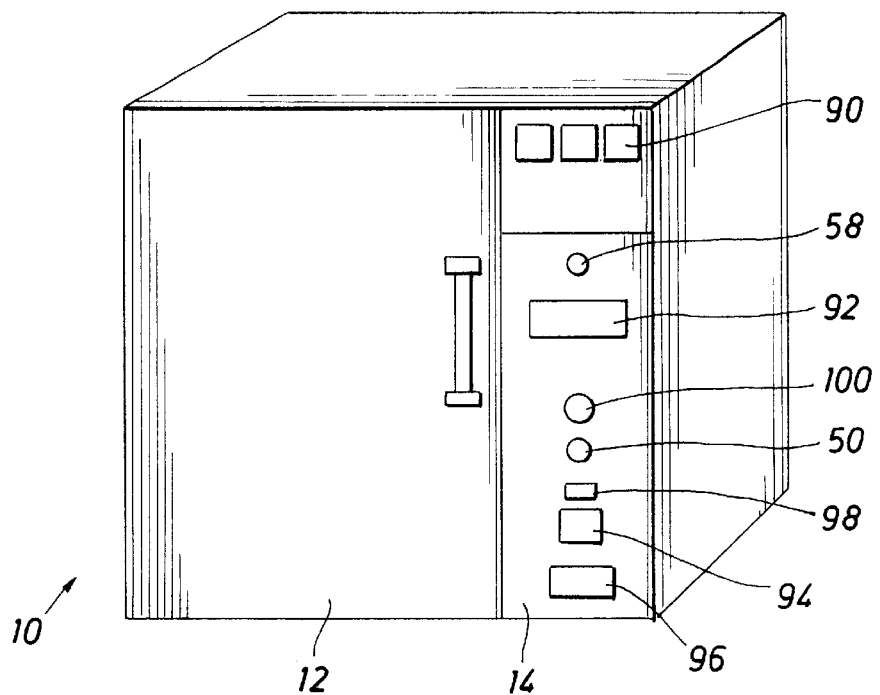
FIG. 1 is a perspective view of the convection chiller of the invention.

A low temperature air convection chiller in accordance with the present invention, generally identified by the reference numeral 10, is illustrated in FIG. 1. The convection chiller 10 comprises a housing which in the preferred embodiment shown in FIG. 1 is substantially rectangular in shape. The chiller 10 is sized to fit on a standard kitchen counter top and designed for household use.

Referring still to FIG. 1, the chiller 10 includes top, bottom and sidewall members forming the housing of the chiller 10. A sealed magnetic door 12 and control panel 14 form the front of the chiller 10. The top, bottom and sidewalls of the chiller 10 are of double wall construction. Each wall comprises an inner and outer panel separated by bracket members and defining a space therebetween.

Figure 2:
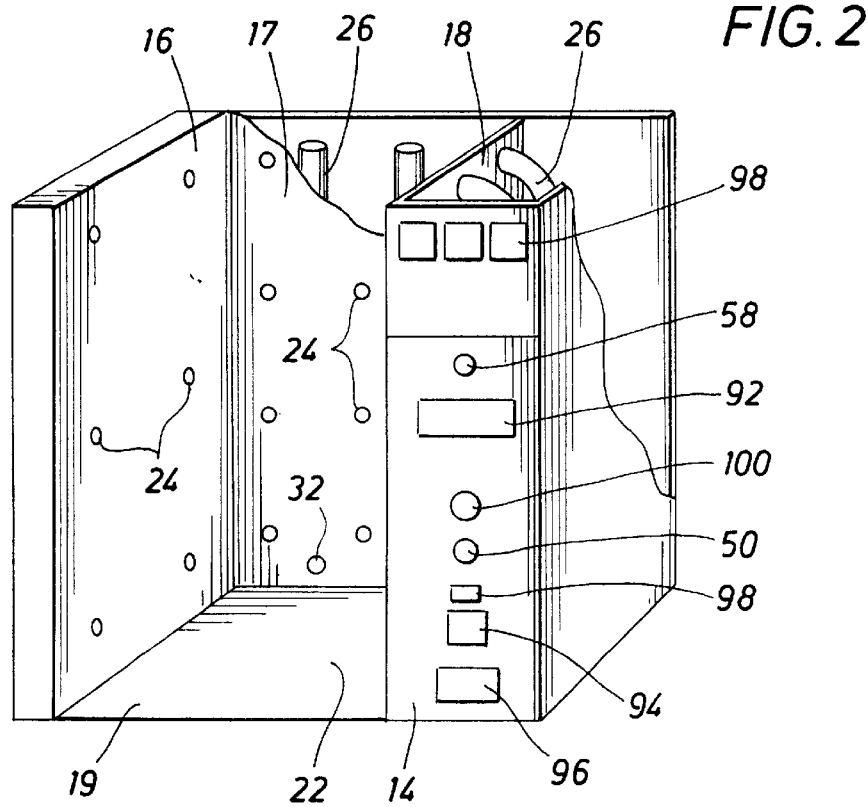
FIG. 2 is a perspective, partially broken view of the convection chiller of the invention.
Figure 6:
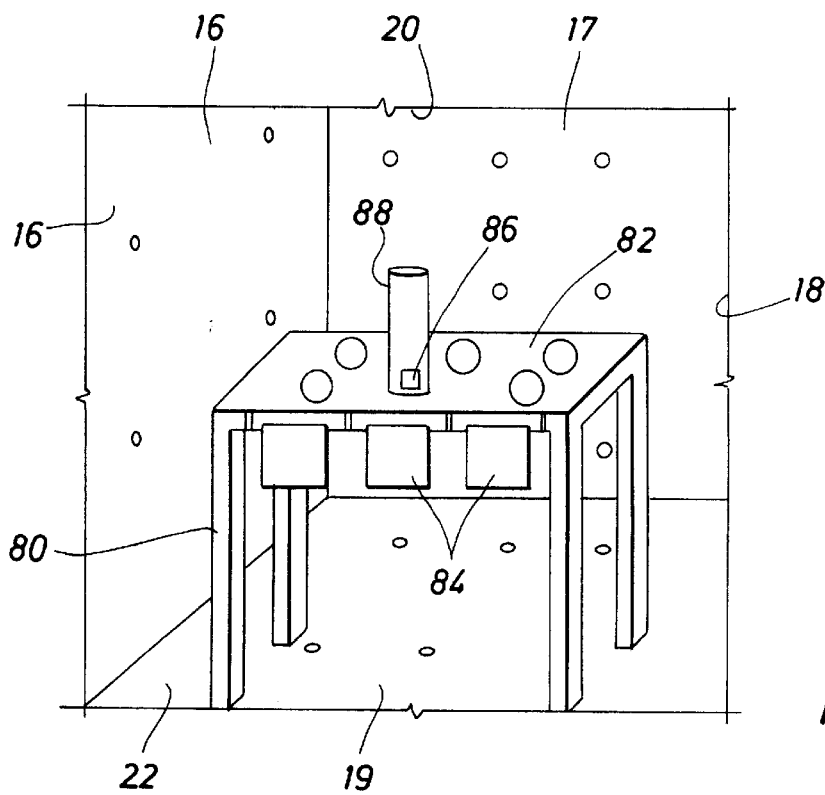
FIG. 6 is a partial perspective view of a tray located within the chilling compartment of the invention.

Referring now to FIGS. 2 and 6, it will be observed that the inner panels 16, 17, 18, 19 and 20 of the top, bottom, side and back wall members of the chiller 10 enclose a chilling compartment 22. The inner panels 16–20 include a plurality of air inlet ports or nozzles 24 formed therein. The nozzles 24 are connected to the distal ends of air conduits 26 of an air distribution manifold connected to the refrigeration unit of the chiller 10.

Figures 3, 4:
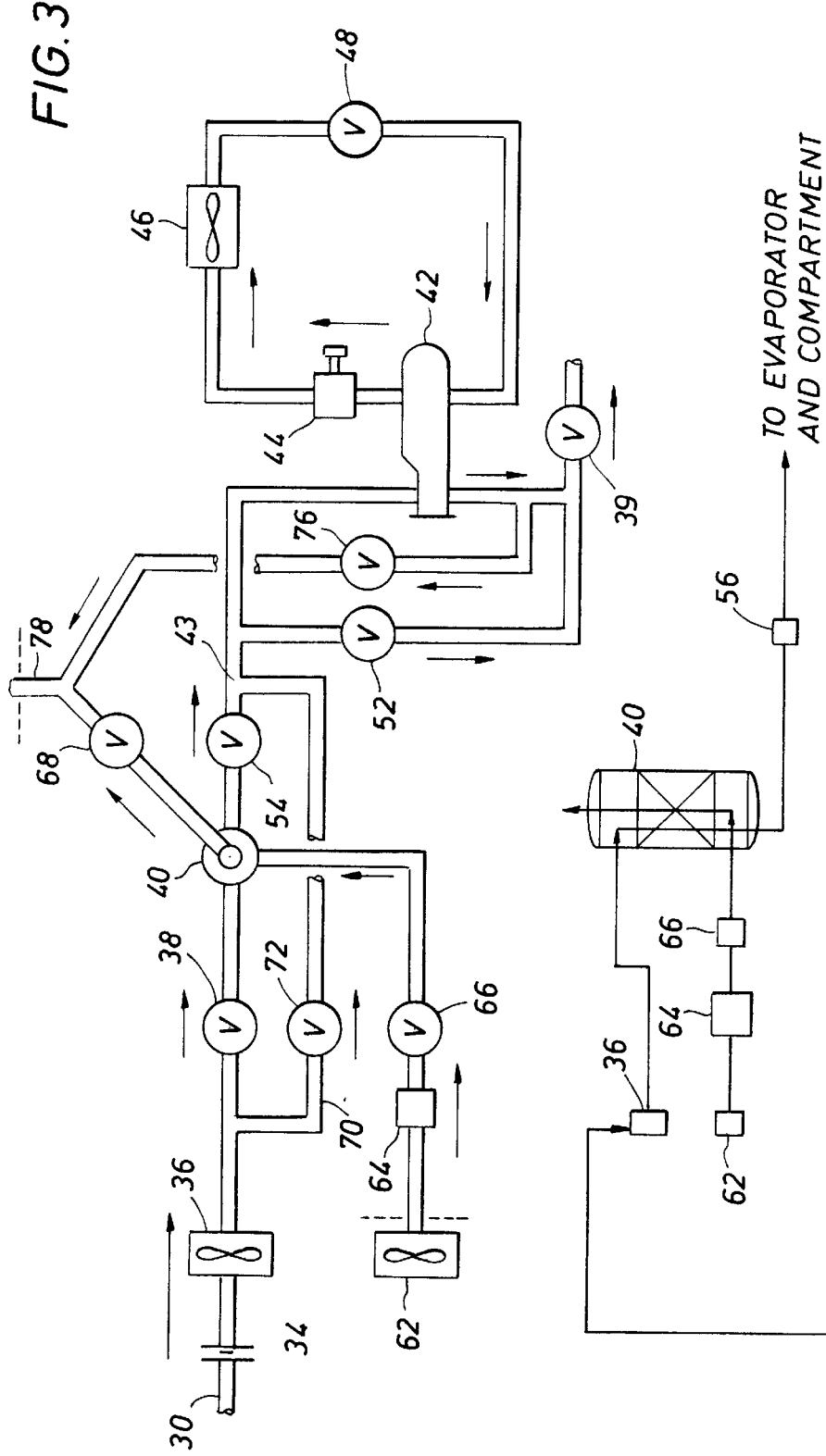
FIG. 3 is a schematic view of the refrigeration unit of the invention.
FIG. 4 is a block diagram depicting air flow through the chilling compartment of the invention.

Referring now to FIG. 3, a schematic diagram of the refrigeration unit of the invention is shown. Beginning at the left end of FIG. 3, an air recirculating line 30 is shown. The line 30 is connected to the exit port 32, shown in FIG. 2, of the compartment 22. A restriction orifice 34 is incorporated in the line 30 so that back pressure is developed in the chilling compartment 22 to ensure that chilled air does not bypass the items to be chilled which are placed in the compartment 22. The orifice 34 prevents short circuiting of air out of the compartment 22. That is, by creating back pressure in the compartment 22, chilled air entering the compartment 22 through the inlet nozzles 24 does not channel to the exit port 32. Rather, the chilled air entering the compartment 22 circulates about the items placed therein and chills them to the desired temperature.

Referring still to FIG. 3, the air exiting the compartment 22 is recirculated when the chiller 10 is operating under normal conditions. To this end, a recirculating fan or compressor 36 directs the air through a drier inlet valve 38 into a drier 40. The drier 40 contains desiccant for absorbing water from the air before the air enters the evaporator 42. The evaporator 42 chills the air to a minimum of −20° F. before entering the compartment 22. The air is dried to prevent the formation of hydrates at low temperature.

Figure 5:
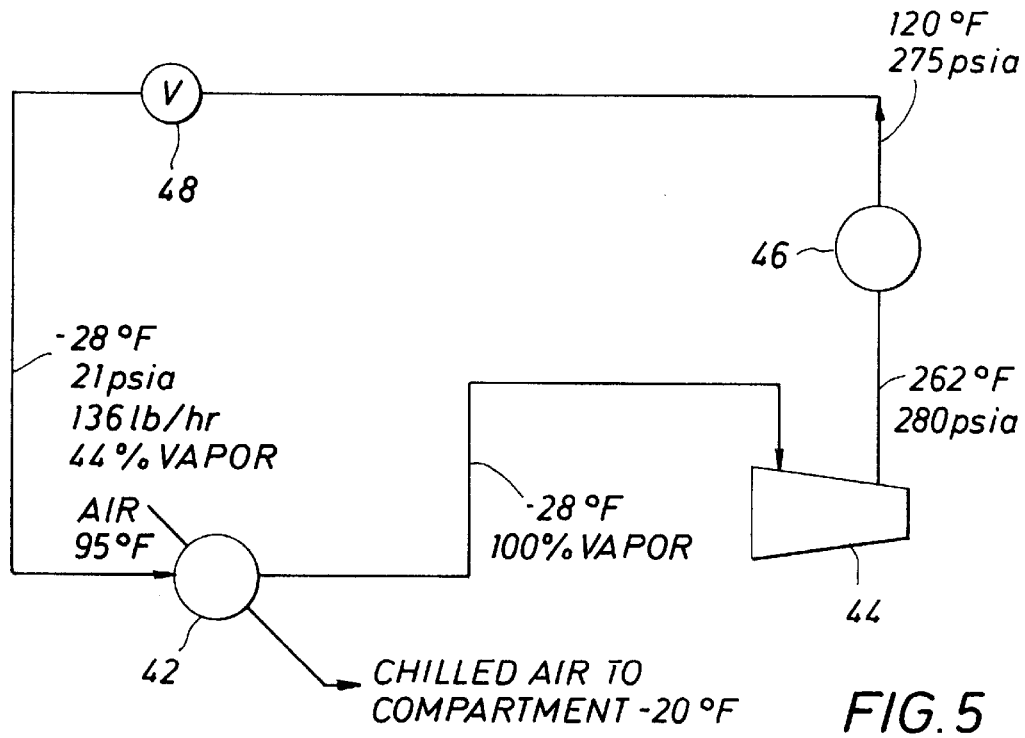
FIG. 5 is a block diagram depicting the refrigeration unit of the invention.

The refrigeration unit of the invention is further illustrated in the block diagram of FIG. 5. The refrigerant, for example refrigerant 22, as a vapor is compressed from about 21 psia to 275 psia in a compressor 44 driven by a motor (not shown in the drawings). The vapor enters the compressor 44 at a temperature of −28° F. and exits from the compressor at a temperature of 252° F. The vapor passes through a condenser 46 and exits at 120° F. and 275 psia. The gas then passes through an expansion valve 48 where it is expanded from 275 psia to 21 psia. The refrigerant is cooled as it passes through the expansion valve 48 from 120° F. to −28° F. The refrigerant then passes through the evaporator 42 and the cycle is repeated.

Referring again to FIG. 3, the recirculated air is directed through the drier 40 as noted above. From the drier 40 the air passes through the evaporator 42 and into the compartment 22. The evaporator 42 cools the recirculated air to about −20° F. before the air enters the compartment 22 through the nozzles 24. The air temperature entering the compartment 22 may be regulated by setting a temperature dial 50 located on the control panel 14, shown in FIG. 2. Setting the dial 50 for a particular temperature actuates a bypass valve 52 which permits warm air exiting the drier 40 to be diverted around the evaporator 42 and mixed with the cold air exiting the evaporator 42 prior to entering the compartment 22.

As the dry cold air is circulated through the compartment 22, it picks up moisture as it chills the food products placed in the chilling compartment 22. In normal use, the moisture in the circulated air is removed by the drier 40. However, when the desiccant in the drier 40 has reached its capacity to remove water from the air, a valve 54 is closed for blocking air flow to the compartment 22. The valve 54 is actuated by a sensor 56, shown in FIG. 4, which monitors the moisture content of the air exiting the drier 40. When the moisture of the air exiting the drier 40 exceeds a dew point of −20° F., the valve 54 is closed and a warning indicator 58 on the panel 14 signals the operator to initiate the regeneration cycle.

The regeneration cycle is initiated by a regeneration start button 60 located on the control panel 14 which actuates a fan 62 and a heater 64. The fan 62 draws air from the atmosphere and forces it through the heater 64 and valve 66 into the drier 40. The valve 66 is closed during normal operation of the chiller 10 and is automatically opened when the regeneration cycle is initiated. The heated air is directed through the drier 40, shown in the block diagram of FIG. 4. The heated air drives off the moisture absorbed by the desiccant in the drier 40 and is expelled through a valve 68 out the back of the housing of the chiller 10.

Regeneration of the drier bed of the drier 40 typically requires an air temperature of about 400° F., a temperature too high to be expelled from the chiller 10. The exiting regeneration air temperature is reduced to about 100°–150° F. by mixing the heated drier regeneration air with the cold refrigerated air of the chiller 10 prior to release into the atmosphere. During the regeneration cycle, the valves 38 and 39 of the air flow circuit are closed and air flow is directed through a conduit 70 and valve 72, which is closed during normal operation of the chiller 10. The air flow therefore by passes the drier 40 and enters the inlet side of the evaporator 42 at point 43. The air temperature is reduced in the manner previously described, but since the valve 39 is closed, the chilled air is carried through conduit 74 for mixing with the heated regeneration air exiting the drier 40. During the regeneration cycle, the valve 76 in the conduit 74 is opened so that the heated air and cold air mix in the exit conduit 78, thereby reducing the exiting air temperature to an acceptable temperature. When the regeneration cycle is completed, the warning indicator turns off and the chiller 10 is again ready for use.

Referring again to FIGS. 1 and 2, operation of the chiller 10 is controlled by input instructions at the control panel 14. The control panel 14 includes a keypad 90 for input of the time duration of the chilling or freezing cycle. A clock 92 provides the time and a timer 94 counts down the time of the chilling or freezing cycle. Start and stop touch button 96 and 98 start and stop the chilling or freezing cycle. Pressing the regeneration start button 100 initiates the regeneration cycle and automatically opens the valves 72 and 76 while simultaneously closing the valves 38 and 39 for diverting cold air for mixing with hot air exiting the drier 40.

Referring now to FIG. 6, a removeable tray 80 is shown placed within the compartment 22 of the chiller 10. The tray 80 includes a perforated surface 82 which permits air to circulate about the tray 80. A plurality of magnetic stirrers 84 are located on the tray 70 which may be used in conjunction with a metal stirrer 86 placed in container 88 when chilling a liquid and/or stirring of the food product is desireable.

In the preferred embodiment described above, the chiller 10 is described for household use. It is understood however that the chiller 10 may be sized for commercial use, such as school cafeterias or the like. In the preferred embodiment, the chiller 10 is sized to fit on a standard kitchen counter top. The overall dimensions of the chiller 10 are about 18" high×30" wide×24" deep. The chilling compartment 22 of the chiller 10 is about 16"×18"×18" and includes a removeable rack for supporting the food products to be chilled above the bottom of the compartment 22. The rack is adjustable to accommodate different sized products.

The refrigeration unit of the chiller 10 is sized depending on the refrigerant chosen, the air flow rate and time required to cool, chill or freeze various food products. At an air flow rate of 0.1 to 3 standard cubic feet per second at −20° F., the chiller 10 of the invention will freeze most common food products in less than 1–15 minutes, depending on the item size, composition and texture.

While a preferred embodiment of the invention has been shown and described, other and further embodiments of the invention may be devised without departing from the basic scope thereof, and the scope thereof is determined by the claims which follow.

It is claimed:

1. A convection refrigeration apparatus comprising:
   a) housing means enclosing a chilling compartment, said chilling compartment including a plurality of air inlet nozzles;
   b) manifold means for directing chilled air through said inlet nozzles into said chilling compartment;
   c) means for creating a back pressure in said chilling compartment;
   d) means for drying air recirculated through said chilling compartment;
   e) means for generating a flow of chilled air through said chilling compartment; and
   f) means for controlling the temperature and duration of air flow through said chilling compartment.

2. The apparatus of claim 1 wherein said back pressure means comprises a restriction orifice in an air outlet conduit directing air flow from said chilling compartment.

3. The apparatus of claim 1 including air drying means for removing moisture from air circulating through said chilling compartment.

4. The apparatus of claim 1 including indicator means signaling excess moisture in the air circulating through said chilling compartment.

5. The apparatus of claim 1 including temperature control means for selectively setting the temperature of the air circulating through said chilling compartment.

6. The apparatus of claim 1 including timer means for selectively setting the duration of air circulating through said chilling compartment.

7. The apparatus of claim 1 wherein chilled air flows through said chilling compartment at a rate of 0.1 to 3 standard cubic feet per second at −20° F.

8. The apparatus of claim 1 wherein said housing means is sized to fit on a standard sized kitchen counter top, said housing means being about 18" high×30" wide×24" deep.

9. The apparatus of claim 4 means for removing excess moisture from the air circulating through said chilling compartment.

10. The apparatus of claim 9 including means for heating air flow during the regenerating cycle of the drier bed of said drying means.

* * * * *